United States Patent
Derocher et al.

(10) Patent No.: US 10,640,139 B2
(45) Date of Patent: May 5, 2020

(54) TELESCOPING STEERING COLUMN

(71) Applicant: STEERING SOLUTIONS IP HOLDING CORPORATION, Saginaw, MI (US)

(72) Inventors: Robert C. Derocher, Essexville, MI (US); Todd M. King, Saginaw, MI (US); James E. Rouleau, Burt, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 216 days.

(21) Appl. No.: 15/864,115

(22) Filed: Jan. 8, 2018

(65) Prior Publication Data
US 2019/0210632 A1 Jul. 11, 2019

(51) Int. Cl.
*B62D 1/181* (2006.01)
*B62D 1/183* (2006.01)
*B62D 1/189* (2006.01)

(52) U.S. Cl.
CPC ............. *B62D 1/181* (2013.01); *B62D 1/183* (2013.01); *B62D 1/189* (2013.01)

(58) Field of Classification Search
CPC ........ B62D 1/183; B62D 1/181; B62D 1/187; B62D 1/185; B62D 1/189
See application file for complete search history.

(56) References Cited

U.S. PATENT DOCUMENTS

| | | | | |
|---|---|---|---|---|
| 2,769,351 A | * | 11/1956 | Serfling | B62D 1/181 74/493 |
| 4,602,520 A | * | 7/1986 | Nishikawa | B62D 1/181 280/775 |
| 4,805,478 A | * | 2/1989 | Beauch | B62D 1/192 74/492 |
| 5,193,848 A | * | 3/1993 | Faulstroh | B62D 1/181 280/775 |
| 5,690,362 A | * | 11/1997 | Peitsmeier | B62D 1/181 280/775 |

(Continued)

FOREIGN PATENT DOCUMENTS

DE 102015216326 B4 9/2016

OTHER PUBLICATIONS

English translation regarding DE102015216326B4, ThyssenKrupp AG; 21 pgs.

*Primary Examiner* — Ruth Ilan
(74) *Attorney, Agent, or Firm* — Dickinson Wright PLLC

(57) ABSTRACT

A telescoping steering column is supported by a vehicle structure, and includes a steering shaft, first, second, and third jackets, and first and second adjustment mechanisms. The steering shaft is adapted to rotate about an axis. The first jacket is adapted to rotatably support the steering shaft. The second jacket is adapted to support the first jacket, and the first jacket is constructed to slide axially with respect to the second jacket. The third jacket is adapted to support the second jacket, and the second jacket is constructed to slide axially with respect to the third jacket. The first adjustment mechanism is supported by the first and second jackets for axial movement of the first jacket with respect to the second jacket. The second adjustment mechanism is supported by the second and third jackets for axial movement of the second jacket with respect to the third jacket.

19 Claims, 2 Drawing Sheets

(56) References Cited

U.S. PATENT DOCUMENTS

| | | | | |
|---|---|---|---|---|
| 5,911,789 A * | 6/1999 | Keipert | ............... | B62D 1/181 |
| | | | | 280/775 |
| 7,275,767 B2 * | 10/2007 | Appleyard | ............ | B62D 1/192 |
| | | | | 280/777 |
| 7,410,190 B2 * | 8/2008 | Sawada | ................... | B62D 1/19 |
| | | | | 180/427 |
| 7,793,980 B2 * | 9/2010 | Fong | ..................... | B62D 1/197 |
| | | | | 280/775 |
| 9,333,983 B2 * | 5/2016 | Lathrop | ................. | B62D 1/04 |
| 2015/0375768 A1 * | 12/2015 | Fevre | ..................... | B62D 1/181 |
| | | | | 74/493 |
| 2017/0029009 A1 * | 2/2017 | Rouleau | ............... | B62D 1/181 |
| 2018/0050720 A1 * | 2/2018 | King | ..................... | B62D 1/184 |
| 2018/0079441 A1 * | 3/2018 | McKinzie | ............... | B62D 1/04 |
| 2018/0086378 A1 * | 3/2018 | Bell | ....................... | B62D 1/181 |
| 2018/0281840 A1 * | 10/2018 | Yoon | ..................... | B62D 1/192 |
| 2018/0319419 A1 * | 11/2018 | Kreutz | .................. | B62D 1/181 |
| 2018/0370559 A1 * | 12/2018 | Swamidason | ......... | B62D 1/185 |
| 2019/0016365 A1 * | 1/2019 | Swamidason | .......... | B62D 1/183 |
| 2019/0111960 A1 * | 4/2019 | Freudenstein | ......... | B62D 1/181 |
| 2019/0185041 A1 * | 6/2019 | Shin | ........................ | B62D 1/04 |
| 2019/0210633 A1 * | 7/2019 | Derocher | .............. | B62D 1/181 |

* cited by examiner

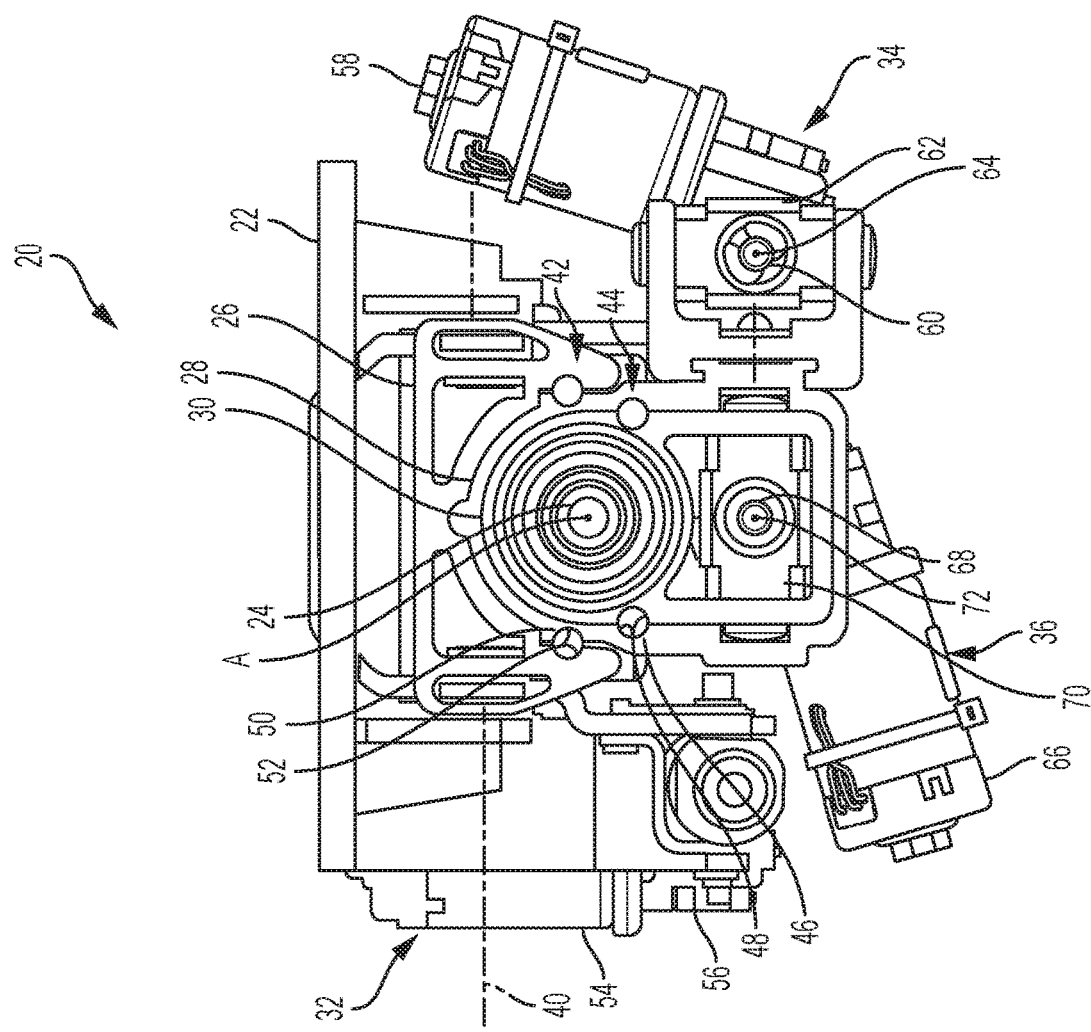

TELESCOPING STEERING COLUMN

BACKGROUND

The present disclosure relates to a telescoping steering column, and more particularly, to a telescoping steering column capable of being stowed.

Steering column assemblies for vehicles are known to include various adjustment devices that permit an operator to selectively position and secure the steering column in any one of a variety of positions. Such adjustment devices may include a rake device that facilitates tilting of the steering column and a telescopic device that facilitates the length of the column which generally dictates how close a steering wheel is positioned to the operator (i.e., extended position), and/or how close to the instrument cluster of the automobile (i.e., retracted position). In general, length and tilt adjustments of the steering column are made available for user comfort while the user is manually maneuvering the vehicle.

Current vehicle advancements may now include autonomous vehicles where an operator may choose to manually drive or maneuver the vehicle, or direct the vehicle to generally maneuver itself during an autonomous mode of operation. While in the autonomous mode, the steering column may not only be in the retracted position, but may also be in a stowed state. Unfortunately, present steering column devices that provide movement between stowed and un-stowed states are limited in both positioning capability and operating speed.

Accordingly, it is desirable to provide a steering column having both telescoping and stowing capability for autonomous vehicles providing a greater range of dynamic and positioning capability.

SUMMARY

In one, non-limiting, exemplary embodiment of the present disclosure, a telescoping steering column is supported by a vehicle structure, and includes a steering shaft, first, second, and third jackets, and first and second adjustment mechanisms. The steering shaft is adapted to rotate about an axis. The first jacket is adapted to rotatably support the steering shaft. The second jacket is adapted to support the first jacket, and the first jacket is constructed to slide axially with respect to the second jacket. The third jacket is adapted to support the second jacket, and the second jacket is constructed to slide axially with respect to the third jacket. The first adjustment mechanism is supported by the first and second jackets for axial movement of the first jacket with respect to the second jacket. The second adjustment mechanism is supported by the second and third jackets for axial movement of the second jacket with respect to the third jacket.

In another embodiment, a telescoping steering column includes a steering shaft, a first jacket, a second jacket, a third jacket, a first adjustment mechanism, and a second adjustment mechanism. The steering shaft is adapted to rotate about an axis. The first jacket is adapted to rotatably support the steering shaft. The second jacket is adapted to support the first jacket, and the first jacket is constructed to slide axially with respect to the second jacket between an extended position and a retracted position. The third jacket is adapted to support the second jacket, and the second jacket is constructed to slide axially with respect to the third jacket between a stowed state and an un-stowed state. The first adjustment mechanism is supported by, and engaged to, the first and second jackets for moving the first and second jackets between the retracted and extended positions. The second adjustment mechanism is supported by, and engaged to, the second and third jackets for moving the second and third jackets between the stowed and un-stowed states.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is an end view of the telescoping steering column.

DETAILED DESCRIPTION

Figure 1:
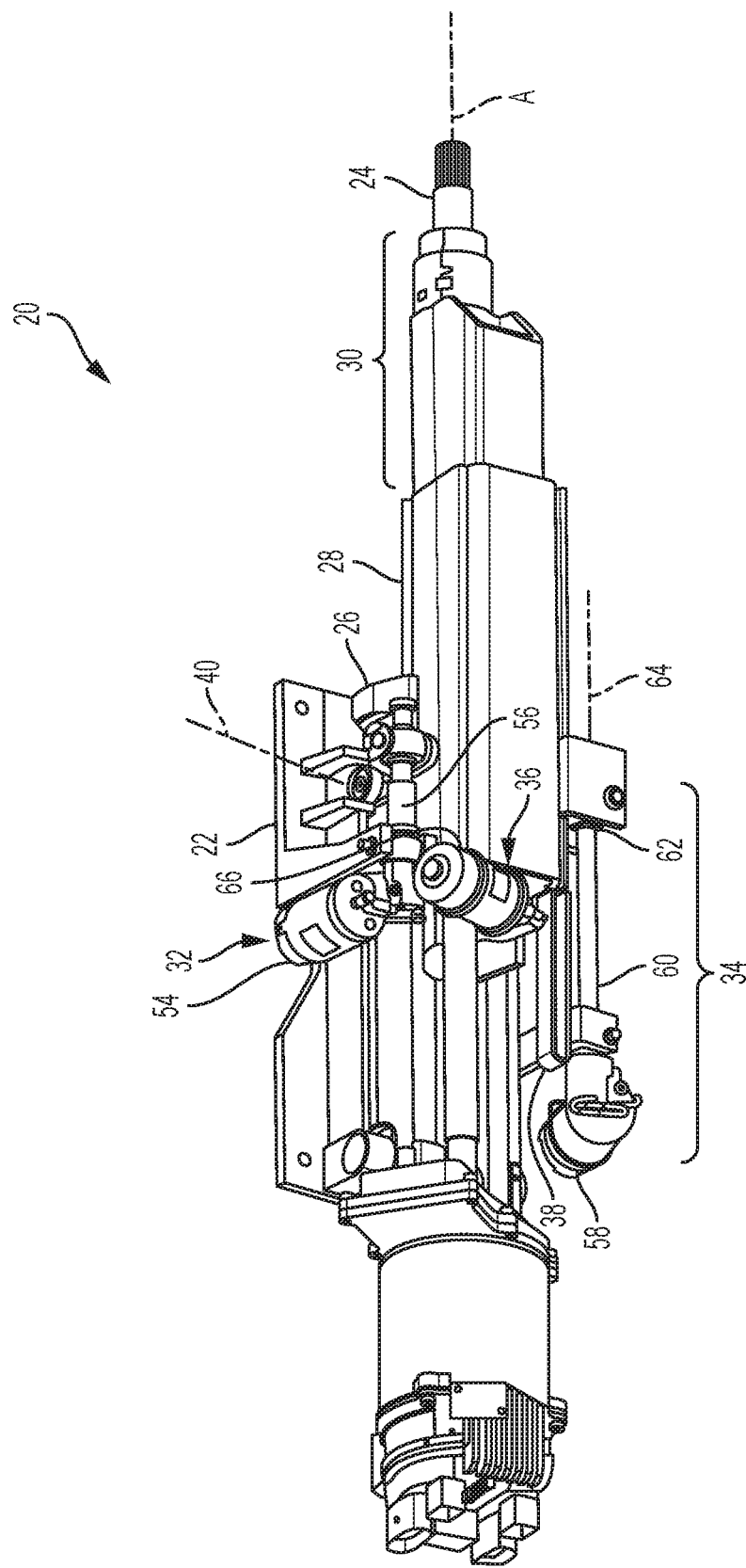
FIG. 1 is a perspective side view of a telescoping steering column in accordance with an exemplary embodiment of the present disclosure.

Referring now to the Figures, where the invention will be described with reference to specific embodiments, without limiting same, a telescoping steering column 20 of the present disclosure for a vehicle, which may be an autonomous vehicle (not shown), is capable of selective adjustment and positioning telescopically, and may be capable of tilt-wise (i.e., rake) positioning. More specifically, the telescoping steering column 20 may be adapted to move axially between stowed and un-stowed states, and adjustably move axially between retracted and extended positions for user comfort and convenience. In one embodiment, the telescoping steering column 20 moves axially between the retracted and extended positions when in the un-stowed state, and may move from the un-stowed state and toward the stowed state when in the retracted position.

In another embodiment, the stowing and axial adjustment motions associated with the respective state(s) and position(s), may occur simultaneously during specific modes of operation. For example, upon a stow command, the telescoping steering column 20 may be adapted to move from the extended position and toward the retracted position, and move from the un-stowed state and toward the stowed state, simultaneously. It is further contemplated that simultaneous operation may occur upon an un-stow command (i.e., vice-versa operation). Simultaneous operation may be beneficial because the desired command may be met much quicker.

Referring to FIGS. 1 and 2, the telescoping steering column 20 is illustrated in the un-stowed state and in the extended position (i.e., nominal position). The telescopic positioning is generally for positioning a steering wheel (not shown) based on the comfort preferences of a driver (i.e., user) who has chosen to manually maneuver, or steer, the vehicle. When the telescoping steering column 20 is in the stowed state, the driver has chosen not to drive the vehicle manually, and instead, the vehicle is maneuvering automatically (i.e., is in an autonomous mode). Preferably, when the telescoping steering column 20 is in the stowed state, the steering wheel is generally out of the way (i.e., not within comfortable reach) of vehicle occupants.

The telescoping steering column 20 is attached to, and moves relative to, a vehicle structure that may be, or may include, a bracket 22. In one embodiment, the vehicle structure 22 may be the undercarriage of a vehicle dash or console. The telescoping steering column 20 may include a steering shaft 24, a plurality of jackets (i.e., three illustrated as 26, 28, 30), a plurality of adjustment mechanisms (i.e., three illustrated as 32, 34, 36), an energy absorbing component, or strap, 38, and a multitude of other components.

Although not illustrated, the steering shaft 24 may be axially collapsible via a splined connection, or other means, generally known in the art. The shaft 24 may further include a distal end portion projecting rearward with respect to the vehicle for attachment to a steering wheel (not shown). The steering shaft 24 may be supported by the jacket 30 (e.g., upper jacket) for rotation about a rotation axis A, and is adapted to axially extend and retract with the jacket 30. The jacket 30 may circumferentially extend continuously about the axis A and steering shaft 24, longitudinally extends along the axis A, may generally be located radially outward from the steering shaft, and may be tubular and/or extruded.

The jacket 30 may be slideably supported by the jacket 28 (i.e., mid jacket) for telescopic motion along the rotation axis A, and between the extended and retracted positions. The jacket 28 may be disposed radially outward from the jacket 30, may circumferentially extend continuously about the jacket 30, and may be tubular and/or extruded. With respect to a vehicle, the jacket 28 may be substantially located forward of the jacket 30 when in the extended position.

The jacket 28 may be slideably supported by the jacket 26 (i.e., lower jacket) for telescopic motion along the rotation axis A, and between the stowed and un-stowed states. That is, the jacket 26 has sufficient strength to support the jackets 28, 30 and at least a portion of the steering shaft 24. The jacket 26 may be generally located radially outward from the jacket 30, may be extruded, and in one embodiment, may be substantially located above the jacket 28. It is contemplated and understood that all three jackets 26, 28, 30 may be extruded, may be cylindrical, or may be a combination of both.

The jacket 26 may be pivotally engaged to the vehicle structure 22. More specifically, the jacket 26 is constructed and arranged to pivot about a pivot axis 40 that may be substantially normal to the rotation axis A. In one embodiment, the vehicle structure 22 and the pivot axis 40 may be disposed generally above the jacket 26, thus the pivot axis 40 is spaced radially outward from the rotation axis A. The pivoting motion of the jacket 26, which at least in-part carries the jackets 28, 30, steering shaft 24, and adjustment mechanisms 34, 36, may be a rake adjustment that may tilt (or raise and lower) a steering wheel for user convenience and comfort.

Referring to FIGS. 1 and 2, and in another embodiment, the telescoping steering column 20 may further include at least one ball-and-track arrangement (i.e. two illustrated as 42, 44, see FIG. 2) adapted to reduce friction when the telescoping steering column 20 telescopically moves between states and positions. Ball-and-track arrangement 42 may be generally carried between, and supported by, the jacket 26 and the jacket 28. Ball-and-track arrangement 44 may be generally carried between, and supported by, the jacket 28 and the jacket 30. The ball-and-track arrangement 42 may include a plurality of balls, or bearings, 50 adapted to ride within an axially extending grove 52 having boundaries defined by the jackets 26, 28. The ball-and-track arrangement 44 may include a plurality of balls, or bearings, 46 adapted to ride within an axially extending grove 48 having boundaries defined by the jackets 28, 30. The extruded design of the jackets 26, 28, 30 along with the design characteristics of the ball-and-track arrangements 42, 44 may optimize the telescoping steering column 20 stiffness and/or natural frequency response.

The adjustment mechanism 32 may be a rake adjustment mechanism adapted to enable pivotal movement about pivot axis 40, and between the jacket 26 and the vehicle structure, or bracket, 22. The adjustment mechanism 32 may include an electric motor 54 and any variety of a gear drive 56 adapted to transform the rotational, mechanical, displacement of a motor shaft to a rake adjustment displacement.

The adjustment mechanism 34 may be a stow adjustment mechanism adapted to telescopically move the jacket 28 with respect to the jacket 26. The adjustment mechanism 34 may include an electric motor 58, a leadscrew 60, and a threaded nut 62. The leadscrew 60 extends along a rotation axis 64, and may be threaded through the nut 62. The electric motor 58 may be rigidly mounted and/or fixed to the jacket 26, and is adapted to rotationally drive the leadscrew 60 about the axis 64. The nut 62 may be engaged to the jacket 28, and is adapted to threadably ride upon the leadscrew 60 when the leadscrew is rotated by the motor 58.

During operation of the adjustment mechanism 34, as the leadscrew 60 rotates in one direction, the nut 62 is axially displaced forward and toward the motor 58 causing the jacket 28 to move with the nut 62, and generally from the un-stowed state and toward the stowed state. When the reversible motor 58 causes the leadscrew 60 to rotate in a reverse direction, the nut 62 is axially displaced rearward and away from the motor 58 causing the jacket 28 to move with the nut 62, and generally from the stowed state and toward the un-stowed state. In another embodiment, it is contemplated and understood that the nut 62 may be engaged to jacket 26 and the motor 58 may be fixed to the jacket 28. In yet another embodiment, the adjustment mechanism may operate manually, and may not include an electric motor.

The adjustment mechanism 36 may be a user specific adjustment mechanism adapted to telescopically move the jacket 30 with respect to the jacket 28. The adjustment mechanism 36 may include an electric motor 66, a leadscrew 68, and a threaded nut 70. The leadscrew 68 extends along a rotation axis 72, and may be threaded through the nut 70. The electric motor 66 may be rigidly mounted and/or fixed to the jacket 28, and is adapted to rotationally drive the leadscrew 68 about the axis 72. The nut 70 may be engaged to the jacket 30, and is adapted to threadably ride upon the leadscrew 68 when the leadscrew is rotated by the motor 66.

During operation of the adjustment mechanism 36, as the leadscrew 68 rotates in one direction, the nut 70 is axially displaced forward and toward the motor 66 causing the jacket 30 to move with the nut 70, and generally from the extended position and toward the retracted position. When the reversible motor 66 causes the leadscrew 68 to rotate in a reverse direction, the nut 70 is axially displaced rearward and away from the motor 66 causing the jacket 30 to move with the nut 70, and generally from the retracted position and toward the extended position. In another embodiment, it is contemplated and understood that the nut 70 may be engaged to jacket 28 and the motor 66 may be fixed to the jacket 30. In yet another embodiment, the adjustment mechanism 36 may operate manually, and may not include an electric motor.

The rotation axes A, 64, 72 may be substantially parallel to one another. The axes 64, 72 may be radially spaced outward from the axis A, and may be circumferentially spaced away from one-another and with respect to axis A.

In one embodiment, the electric motors 58, 66 of the respective adjustment mechanisms 34, 36 may be generally the same. In another embodiment, the electric motors 58, 66 may be adapted to operate at different speeds. For example, the motor 58 may operate faster than motor 66 resulting in a higher axial displacement rate when moving between the stowed and un-stowed states, than the axial displacement rate when moving between retracted and extended positions. In yet a third embodiment, the thread pitch of the leadscrews 60, 68 may be different, resulting in different axial displacement rates between the nuts 62, 70 of the respective adjustment mechanisms 34, 46.

Advantages and benefits of the present disclosure include a telescoping steering column having greater telescope/stow distances than more traditional columns without increasing noise, vibration, and harshness concerns due to more traditional lengthy cantilever distances. Also, because single telescope/stow mechanisms are generally not applied, the column mounting locations may be more rearward in the vehicle thus enabling use of pre-existing, or more common, mounting points on a vehicle platform. Yet further, the three jacket design provides improved packaging when compared to a two jacket design.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. A telescoping steering column supported by a vehicle structure, the telescoping steering column comprising:
   a steering shaft adapted to rotate about an axis;
   a first jacket adapted to rotatably support the steering shaft;
   a second jacket adapted to support the first jacket, the first jacket being constructed to slide axially with respect to the second jacket;
   a third jacket adapted to support the second jacket, the second jacket being constructed to slide axially with respect to the third jacket;
   a first adjustment mechanism supported by and engaged to the first and second jackets for axial movement of the first jacket with respect to the second jacket;
   a second adjustment mechanism supported by and engaged to the second and third jackets for axial movement of the second jacket with respect to the third jacket;
   a first ball-and-track arrangement carried between the second and third jackets for support and axial motion between the second and third jackets; and
   a second ball-and-track arrangement carried between the first and second jackets for support and axial motion between the first and second jackets.

2. The telescoping steering column set forth in claim 1, wherein the second adjustment mechanism includes a second electric motor for driving the second jacket axially with respect to the third jacket.

3. The telescoping steering column set forth in claim 2, wherein the second adjustment mechanism includes a second leadscrew extending axially and being rotatably driven by the second electric motor, and a second nut threaded to the second leadscrew, and wherein the second electric motor is attached to one of the second jacket and the third jacket, and the second nut is attached to the other of the second jacket and the third jacket.

4. The telescoping steering column set forth in claim 3, wherein the first adjustment mechanism includes a first electric motor, a first leadscrew extending axially and rotatably driven by the first electric motor, and a first nut threaded to the first leadscrew, and wherein the first electric motor is attached one of the first jacket and the second jacket, and the first nut is attached to the other of the first jacket and the second jacket.

5. The telescoping steering column set forth in claim 4, wherein the first adjustment mechanism is constructed to move the first jacket between an extended position and a retracted position.

6. The telescoping steering column set forth in claim 5, wherein the first and second electric motors are configured to selectably operate in unison.

7. The telescoping steering column set forth in claim 5, wherein the second electric motor is constructed to operate faster than the first electric motor.

8. The telescoping steering column set forth in claim 2, wherein the second adjustment mechanism is constructed to move the second jacket between an un-stowed state and a stowed state.

9. The telescoping steering column set forth in claim 1, wherein the first adjustment mechanism includes an electric motor for driving the first jacket axially with respect to the second jacket.

10. The telescoping steering column set forth in claim 9, wherein the first adjustment mechanism is constructed to move the first jacket between an extended position and a retracted position.

11. The telescoping steering column set forth in claim 9, wherein the first adjustment mechanism includes a leadscrew extending axially and being rotatably driven by the electric motor, and a nut threaded to the leadscrew, and wherein the motor is attached to one of the first jacket and the second jacket, and the nut is attached to the other of the first jacket and the second jacket.

12. The telescoping steering column set forth in claim 1, wherein the third jacket is adapted to be pivotally engaged to the vehicle structure.

13. The telescoping steering column set forth in claim 12, further comprising:
   a third adjustment mechanism carried between the vehicle structure and the third jacket for rake adjustment of the third jacket.

14. The telescoping steering column set forth in claim 1, wherein the third jacket is an extruded third jacket.

15. The telescoping steering column set forth in claim 14, wherein the second jacket is an extruded second jacket.

16. The telescoping steering column set forth in claim 15, wherein the first jacket is an extruded first jacket.

17. A telescoping steering column comprising:
   a steering shaft adapted to rotate about an axis;
   a first jacket adapted to rotatably support the steering shaft;
   a second jacket adapted to support the first jacket, the first jacket being constructed to slide axially with respect to the second jacket between an extended position and a retracted position;

a third jacket adapted to support the second jacket, the second jacket being constructed to slide axially with respect to the third jacket between a stowed state and an un-stowed state;

a first adjustment mechanism supported by and engaged to the first and second jackets for moving the first and second jackets between the retracted and extended positions;

a second adjustment mechanism supported by and engaged to the second and third jackets for moving the second and third jackets between the stowed and un-stowed states;

at least one first ball-and-track arrangement carried between the second and third jackets for support and axial motion between the second and third jackets; and at least one second ball-and-track arrangement carried between the first and second jackets for support and axial motion between the first and second jackets.

18. The telescoping steering column set forth in claim 17, wherein the first and second adjustment mechanisms are configured to selectably operate in unison and independently for controlling speed of axial displacement.

19. The telescoping steering column set forth in claim 17, wherein the at least one first ball-and-track arrangement includes a plurality of first ball-and-track arrangements and the at least one second ball-and-track arrangement includes a plurality of second ball-and-track arrangements.

* * * * *